United States Patent

[11] 3,601,539

[72] Inventor Herman Da Silva
Voorburg, Netherlands
[21] Appl. No. 829,331
[22] Filed June 2, 1969
[45] Patented Aug. 24, 1971
[73] Assignee De Staat Der Nederlanden Ten Deze Vertegenwoordigd Door De Directeur-Generaal Der Posterijen Telegrafie En Telefonie
The Hauge, Netherlands
[32] Priority June 6, 1968
[33] Netherlands
[31] 6807940

[54] PHASE SYNCHRONISM SYSTEM FOR A ONE-WAY TELEGRAPH CONNECTION
15 Claims, 4 Drawing Figs.

[52] U.S. Cl. .......... 178/4.1, 179/69.5
[51] Int. Cl. .......... H04l 7/10
[50] Field of Search .......... 178/4.1, 3, 17 B, 53.1, 69.5, 89

[56] References Cited

UNITED STATES PATENTS

| | | | |
|---|---|---|---|
| 3,012,096 | 12/1961 | Steinmetz et al. .......... | 178/17 B |
| 3,012,097 | 12/1961 | Steeneck .......... | 178/69.5 |
| 3,005,041 | 10/1961 | Sellers, Jr. .......... | 178/4.1 |
| 2,993,955 | 7/1961 | Neiswinter .......... | 178/4.1 |

*Primary Examiner*—Kathleen H. Claffy
*Assistant Examiner*—Thomas W. Brown
*Attorney*—Hugh Adam Kirk

ABSTRACT: A one-way telegraph system for permitting recurring phase synchronism checks by transmitting at predetermined intervals a definite series of alternate special service and/or idle time signals which form a start signal. This system includes means for transmitting each signal twice separated by a predetermined time interval, three successive registers therefor, means for detecting in the transmitter a certain regularly occurring signal, such as the "line feed" signal, counter means for interrupting traffic for said predetermined interval, means for generating said start signal in said registers and transmitting said start signal during said predetermined interval, and a pulse distributor for controlling all said means.

PATENTED AUG 24 1971 3,601,539

SHEET 1 OF 3

INVENTOR.
HERMAN DA SILVA

BY Hugh A. Kirk

ATTORNEY

INVENTOR.
HERMAN DA SILVA

BY Hugh A. Kirk

ATTORNEY

INVENTOR.
HERMAN DA SILVA
BY Hugh A Kirk
ATTORNEY

PHASE SYNCHRONISM SYSTEM FOR A ONE-WAY TELEGRAPH CONNECTION

BACKGROUND OF THE INVENTION

Such a system is known from the published Netherlands Pat. application No. 6604449 made by the applicant. This system provides a method of establishing synchronism before the transmission of traffic. It is possible, however, that a receiver is switched on at a moment when traffic is going on already. In the system according to the Netherlands patent application a receiver cannot enter into synchronism when traffic transmission is in progress.

SUMMARY OF THE INVENTION

The invention relates to a system for transmitting information in a one-way telegraph connection which allows a receiver to enter into synchronism during traffic transmission. For this purpose the system is so arranged that during traffic transmission, phasing can be effected by transmitting a start criterion at regular intervals, such as at the beginning of a fresh line.

It can further be so arranged that, if in the transmitter the supply of the line feed signal "NR" is detected, the supply of fresh traffic signals to the transmitter is interrupted for the duration of a specified number of signal cycles for a start criterion of a number of special service I-signals alternating with an equal number of idle time α-signals to be generated and transmitted, after which the line feed signal "NR" is transmitted.

BRIEF DESCRIPTION OF THE VIEWS

The above-mentioned and other features, objects, and advantages, and a manner of attaining them are described more specifically below by reference to an embodiment of this invention shown in the accompanying drawings, wherein.

Figure 2:
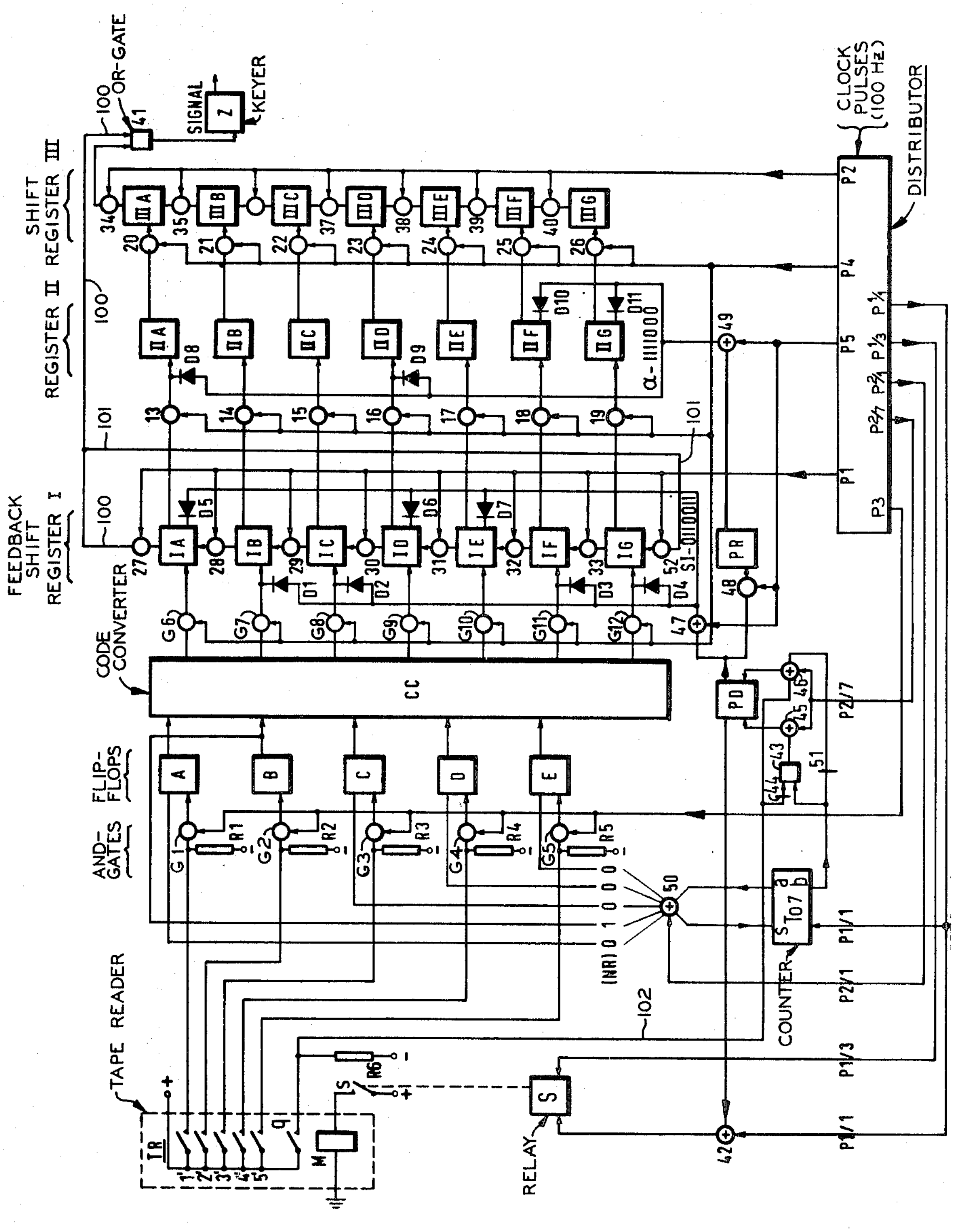
FIG. 2 is a schematic block wiring diagram of a transmitter circuit according to a preferred embodiment of this invention.
Figure 3:
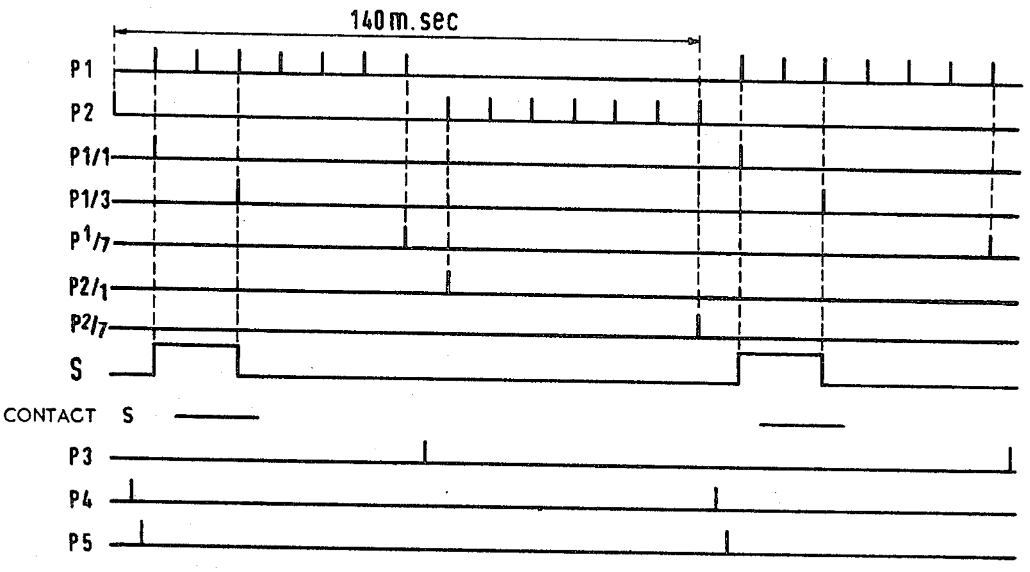
Figure 4:
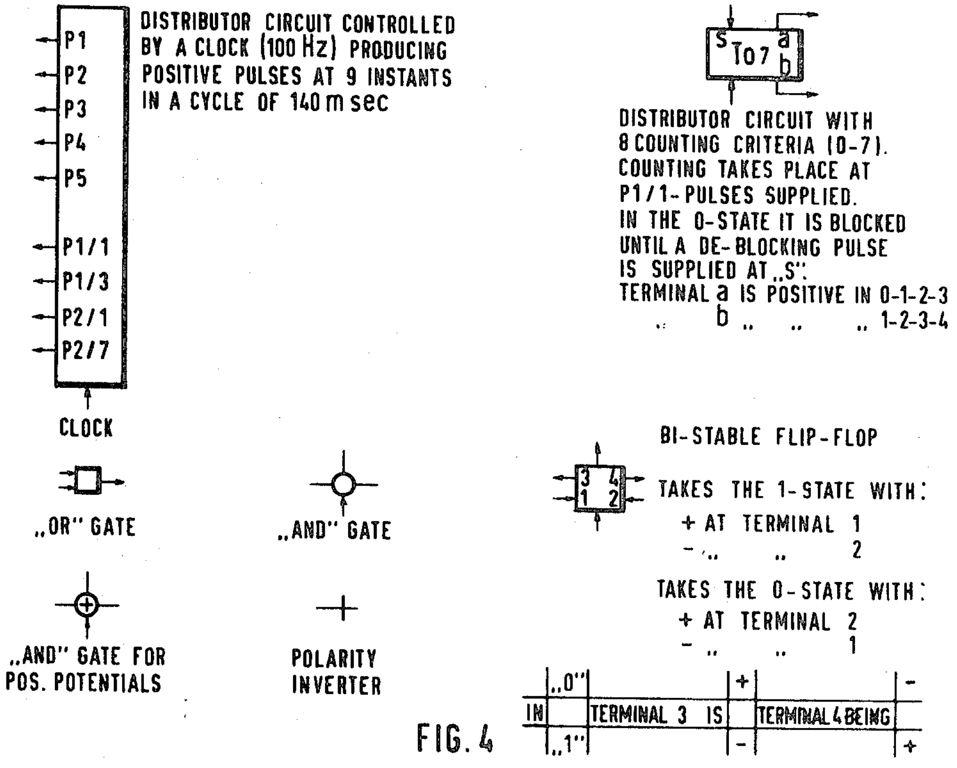

FIG. 3 discloses a plurality of pulse waveform diagrams indicating the times at which the various pulses mentioned in the description of FIG. 2 occur; and FIG. 4 is a table of the blocks and other symbols used in the diagram of FIG. 2 together with descriptions of their functions.

DETAILED DESCRIPTION OF THE PREFERRED EMBODIMENT

Figure 1:
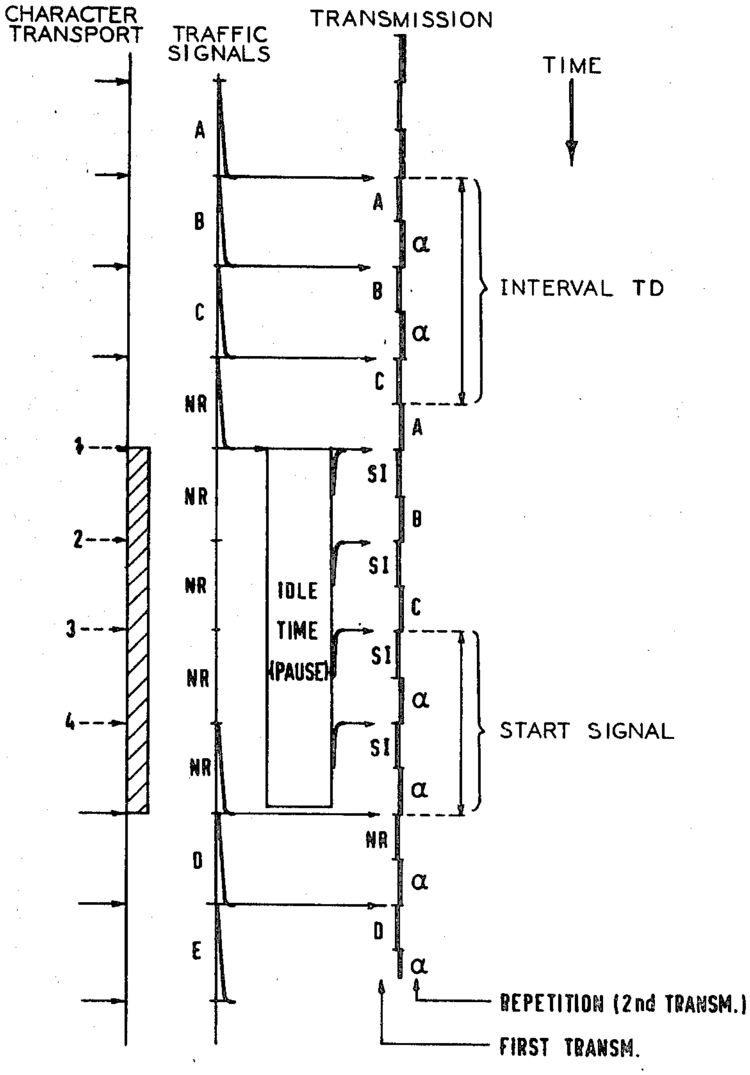
FIG. 1 is a schematic time diagram of the signals involved in the operation of the system according to this invention.

Beside the middle column of the time diagram of FIG. are indicated the traffic signals "A," "B," "C" etc. and the "line feed" signal "NR" supplied in succession to the transmitter. This supply takes place at a rate of 50 bauds; while the transmission speed is double this speed, i.e. 100 bauds, so that every signal is transmitted twice in this embodiment. Along the transmission or right-hand column in FIG. 1, the signals transmitted for the first time are indicated at the left, and the signals transmitted for the second time (repeated signals) are indicated at the right. The time difference between the two transmissions is designated by "interval TD."

For the receiving stations it is not only important that they start in the correct character phase, but also that they start in such a way that the first signals and the repeated signals fall at the correct places in the receiving distributors. This is essential, because the receivers are so arranged that the first signal received (at the left of the transmission or right-hand column in FIG 1) is tested first. If this first signal is found incorrect, it is rejected, but if found correct it is stored in order to be printed after the reception of the relevant second transmission (repetition) of that signal. If the second transmission (repetition) of that signal is found correct, but the first is not, the second will be printed. If the two or both signals are incorrect, no correction is possible and an error symbol is printed. Thus the interchange of first and second transmission signals can be disastrous.

The "start" signal ensures that at the start the special service signal "SI" or I-signal is recorded in the direct (first) signal location, and the regular idle time α signal in the repetition (second) signal location. For this purpose the receivers are equipped with a receiver shift register through which every signal received is shifted at the rate of 100 bauds. When this register is entirely occupied by the I-signal, a provisional start will be made and a test will be carried out on the next signal, in order to ascertain whether or not it is an α-signal. If it is, the start will be considered as correct and definitive, but if it is not, the receiver will fall back to standby.

Thus, the service signals I-α-I-α, forming the "start signal," are transmitted in an uninterrupted alternation when no information is transmitted, so that every receiver has an ample opportunity to get into phase. Nevertheless there will be receiving stations which receive no signals until the transmission of information is in progress or which have lost phase. Consequently, these stations would be deprived of all further information. Now according to this invention this "start signal" is repeated at regular intervals, for which the "line feed" signal "NB" has been chosen as criterion. This signal "NR," or the bit combination 01000, is bound to occur at least once is every 64 signals, which is the maximum length of a line in a teleprinter. Now the transmitter is provided with means, namely a "line feed" signal, for interrupting the traffic supply for the duration of four signals in order to transmit this four-signal or character cycle "start signal" In FIG. 1 this is indicated by hatching along the (character transport or signal supply, left-hand column) at the dotted arrows "1" through "4." During this interruption of the traffic supply only two of the four signals of the "start" signal sequence are effective, because the first two "SI" or I-signals are followed by the repeated signals (in the example in FIG. 1: "B" and "C" and thereafter followed by the α-signal. Thus after the four "SI" or I-signals are transmitted, the signal (NR) is transmitted.

In the transmitter represented by the block diagram of FIG. 2, the contacts 1′ through 5′ of the tape reader TR pass the information supplied by the five-hole tape to the AND gates G1 through G5; a 1-bit passing as a + potential and a 0 as a - potential. These AND gates G1 through G5 controlled by P3-pulses occurring at instants indicated in FIG. 3, put the flip-flops A through E in the 1-state or the 0-state in accordance with the information read. The outputs of these flip-flops A–E control the code converter CC consisting of logic circuits as may be considered well known for converting a five-unit Baudeau code into a seven-unit balanced or constant ratio code, such as in U.S. Pat. No. 2,518,405. Via the AND gates G6 through G12 controlled by P4-pulses, the outputs of this code converter CC control the flip-flops IA through IG, notably in such a manner that these seven flip-flops IA—IG exhibit the 1–0 configuration of the relevant seven-bit constant-ratio signal. These flip-flops are arranged as a shift register I, so that under the control of P1-pulses occurring seven times at intervals of 10 (milliseconds), the information stored in flip-flops IA through IG is led via the AND gates 28 through 33, conductor 100, and the OR gate 41 to the keying flip-flop Z, which transmits the seven-bits information for the first time.

The seven P1-pulses are immediately followed by seven P2-pulses spaced by the same intervals as the P1-pulses with the pulse P2/1 occurring 10 ms. after the pulse P1/7, see FIG. 3. Now, via the AND gates 34 to 40, the P2 pulses shift the information from the shift register IIIA—IIIG through the OR gate 41 to keyer Z. Thus the keyer flip-flop Z keys alternately a signal from the shift register I and from the shift register III, so that the first transmission of a signal takes place from the shift register I and the second from the shift register III.

After the transmission of the register I information, the contents of the shift register I are transferred via the AND gates 13 through 19, controlled by P4-pulses, to the storage register II. At the same time the information contained in the storage register II is transferred via the AND gates 20 through 26, also controlled by the same P4-pulses, to the shift register III. Furthermore this same P4-pulse transfers the fresh information from the code converter CC via the AND gates 6 to 12 through the first shift register I. The P4-pulse appears once every 140 ms. so that every 140 ms. the information is shifted from one register to the next register. When, under the control of P1-pulses, shift the register I bit-information is transmitted successively to the keyer Z, and the information delivered at flip-flop IA is written back into the register again at flip-flop IG, via conductors 100 and 101 and the AND gate 52, so that after seven P1-pulses the shift register I contains the original information again. Thus this first shift register I is also a feedback shift register.

Once every 140 ms. the flip-flop S is put in the 1-state for the duration of 20 ms. (see also FIG. 3) and a relay connected to it is energized to close the contact *s* for 20 ms. thus effecting the energization of the transport magnet M for transporting the tape through the tape reader TR.

When the tape reader TR is switched off, i.e. when its *g*contact is open, a negative potential is applied via register R6 and conductor 102 to the inverter 44, as a result of which a positive potential appears at the OR-gate 43, so that the flip-flop PD assumes the 1-state under the control of a P2/7-pulse applied to the AND gate 45. The flip-flop PD then applies a positive potential to the AND gate 47, so that this gate 47, under the control of the P5-pulse, puts the flip-flops IB, IC, IF and IG in the 1-state via the diodes D1 through D4, and the flip-flops IA, ID and IE in the 0-state via the diodes D5, D6 and D7. Irrespective of the formation the flip-flops have just assumed via the code converter, the P5-pulse puts these flip-flops IA—IG into the configuration 0110011, which is the bit combination for the special service signal "SI" or "I." The same P5-pulse puts the flip-flop PR in the 1-state via the gate 48. The next P4-pulse transfers this special service signal "I" or "SI" from the register I to the register II. But since flip-flop PR is in the 1-state, the next P5-pulse immediately following the P4-pulse, will change the combination for signal "SI" just set up in the register II, into the bit-combination 1111000 for the idle time signal "$\alpha$" via the diodes D8, D9, D10 and D11. Then at the next P4-pulse this combination is transferred to the register III, so that when this register III is read out by P2 pulses, the bit-combination for idle time "$\alpha$" is transmitted.

So if the tape reader TR is switched off permanently, flip-flops PD and PR will stay in the 1-state and the idle time transmission will be as follows: signal "I," "$\alpha$," signal "I," "$\alpha$," etc. The switching-in of the tape reader causes the negative potential at the inverter 44 to disappear and via this circuit the gate 45 will become inactive. On the other hand the positive potential now existing is applied to the gate 46, so that flip-flop PD takes the 0-state as does the flip-flop PR at the next P5-pulse, so that from then on the contents of the register I and II are no longer changed into the signals "I" and "$\alpha$."

When the tape reader reads the line feed signal "NR," the flip-flops A, C, D and E take the 0-state, whereas flip-flop B assumes the 1-state. Because, as will be seen later, the potential at terminal *a* of the counting circuit T*07* is positive too, this signal "NR" bit combination causes the gate 50, controlled by the pulse P2/1, to deliver a pulse which deblocks (starts) this counting circuit T*07* at its input terminal *s*.

When deblocked at terminal *s* this counting circuit T*07* pass through the states 0 to 7 can pass through the states 0 to 7 under the control of the P1/1-pulse, which appears once every 140 ms. The output terminal *a* is positive in the counting state 0, so the gate 50 is only conducting, when the counter T*07* is at normal and the "line feed" bit combination "NR" is supplied. The output terminal *b* is positive in the counting states 1, 2, 3 and 4 and puts the flip-flop PD in the 1-state from terminal *b* via the OR gate 43 and the gate 45, just as if the tape reader TR were switched off. This positive *b*-potential is also led via the inverter 51 as a negative potential to the gate 46, so that this gate is blocked. After 4×140 ms. the flip-flop PD is enabled to assume the O-state again via the closed *g*-contact. For the duration of the four periods (character cycles) the flip-flop S is blocked via the gate 42, so that for four more character cycle times there appears no transport pulse at the tape reader TR. After the first four cycles of idle time signals, traffic will continue by first the transmission of the line feed signal "NR" For another four character cycles, i.e. until T*07* has finished counting to 0, the gate 50 cannot become active. This means that possible further line feed combinations will have no effect on flip-flop PD and, consequently, will not cause an idle time interval, so that the transmission of another "start signal" or the special four idle time signal sequence is prevented. Suppose a line feed bit combination has entailed the start of the counter T*o7* and a consequent idle time interval preceding the transmission of the relevant line feed signal. In that case a next line feed signal cannot start the counter anew and initiate an idle time interval until the counter has finished counting and has been restored to normal.

If desired, the fourfold transmission of the signal I/signal $\alpha$ combination to form a start signal as well as the time between which such start signals can be repeated, can be varied by adjusting the intermediate and maximum counting states of the counting circuit T*07*.

By the system according to this invention the most dependable transmission possible is achieved via one channel and with an unambiguous and rapid phasing. In the case of correct (undisturbed) reception, phasing is effected in about half a second.

While there is described above the principles of this invention in connection with specific apparatus, it is to be clearly understood that this description is made only by way of example and not as a limitation to the scope of this invention.

I claim:

1. A phase synchronism system for a one-way telegraph system comprising at the transmitter station:

a. means (TR) for reading successive telegraph signals into the system for transmission, b. means (I, II, III,) for recording three successive signals, c. means (50) for detecting a predetermined signal from said reading means, d. means (T*07*) for interrupting said reading means for a predetermined number of signal cycles controlled by said detecting means, e. means (D1—D11) for generating two different service signals in said recording means controlled by said detecting means, and f. means for alternately transmitting said two generated service signals during said predetermined number of signal cycles that said reading means is interrupted to produce a start signal by which synchronism at a receiver station can be established.

2. A system according to claim 1 wherein said recording means includes three registers (IA—IIIG) for each bit of said three signals.

3. A system according to claim 2 wherein said three registers are successively a feedback shift register (IA—IG), a transferring register (IIA—IIG),

4. A system according to claim 3 wherein said transmitting means reads successively said signals from said feedback shift register and said shift register.

5. A system according to claim 1 including a code-converting means (CC) for converting the signals from said reading means into a constant ratio code before they are recorded in said recording means.

6. A system according to claim 1 wherein said predetermined signal detected in said detecting means comprises a recurring signal in one-way telegraph code signals.

7. A system according to claim 6 wherein said predetermined signal comprises a teleprinter control signal.

8. A system according to claim 7 wherein said teleprinter control signal is the "line feed" signal.

9. A system according to claim 1 wherein said generating means comprises a plurality of pulse-controlled diodes connected to said recording means.

10. A system according to claim 1 wherein said transmitting means includes a keyer (Z) and a distributor means for generating pulses (P1, P2) for transferring said signals from said recording means to said keyer.

11. A system according to claim 10 wherein said pulses alternately transmit signals from the first and the third recording means.

12. A system according to claim 10 wherein said distributor is controlled by clock pulses.

13. A system according to claim 1 wherein said reading means comprises a tape reading means.

14. A system according to claim 1 wherein said means for interrupting said reading means comprises a counter circuit for counting said predetermined number of signal cycles.

15. A system according to claim 1 wherein one of said service signals is an idle time signal.

PO-1050
(5/69)

UNITED STATES PATENT OFFICE
CERTIFICATE OF CORRECTION

Patent No. 3,601,539 Dated Aug. 24, 1971

Inventor(s) Herman Da SILVA

It is certified that error appears in the above-identified patent and that said Letters Patent are hereby corrected as shown below:

Column 1, line 53, after "Fig." insert -- 1 -- . Column 2, line 25, " "NB" " should read -- "NR" -- ; line 26, "is" second occurrence, should read -- in -- ; line 31, after "signal" insert a -- . -- ; line 32, after "the" delete the "(" ; line 33, after "column" delete the ")" ; line 58, after "10" insert -- ms -- . Column 3, line 5, "to" should read -- through -- ; line 6, "through" should read -- to -- ; line 9, "shift the" should read -- the shift -- ; line 21, "gcon-" should read -- q-con- -- ; line 54, "register" should read -- registers -- ; line 59, "T07" should read -- To7 -- ; line 62, "T07" should read -- To7 -- ; line 63, "T07 pass" should read -- To7 -- ; line 64, delete "through the states 0 to 7" ; line 67, "T07" should read -- To7 -- . Column 4, line 1, "g-contact" should read -- q-contact -- ; line 7, after " "NR" " insert a -- . -- , and "T07" should read -- To7 -- ; line 23, "T07" should read -- To7 -- ; line 41, (claim 1), "(T07)" should read -- (To7) -- ; line 57, (claim 3), after the "," insert -- and a shift register (IIA - IIIG). -- .

Signed and sealed this 2nd day of May 1972.

(SEAL)
Attest:

EDWARD M.FLETCHER,JR.
Attesting Officer

ROBERT GOTTSCHALK
Commissioner of Patents